(12) United States Patent
Katrak et al.

(10) Patent No.: US 7,042,363 B2
(45) Date of Patent: May 9, 2006

(54) METHODS AND APPARATUS FOR PRODUCING A THREE-STATE SINGLE WIRE CONTROL

(75) Inventors: Kerfegar K. Katrak, Fenton, MI (US); Paul A. Bauerle, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 211 days.

(21) Appl. No.: 10/794,939

(22) Filed: Mar. 5, 2004

(65) Prior Publication Data

US 2004/0195916 A1    Oct. 7, 2004

Related U.S. Application Data (60) Provisional application No. 60/459,899, filed on Apr. 2, 2003.

(51) Int. Cl.
*G08B 21/00* (2006.01)
(52) U.S. Cl. .................... 340/644; 307/9.1; 200/5 R
(58) Field of Classification Search ............. 340/425.5, 340/644
See application file for complete search history.

(56) References Cited

U.S. PATENT DOCUMENTS 5,714,852 A  *  2/1998  Enderich ................ 318/256
5,883,500 A  *  3/1999  Pezzani ................. 323/217

* cited by examiner

*Primary Examiner*—Jeffery Hofsass
*Assistant Examiner*—George A. Bugg
(74) *Attorney, Agent, or Firm*—Christopher DeVries (57) ABSTRACT

Systems, methods and devices are described that provide a three-state control signal across a single electrical conductor. A three-position switch provides an output signal that selects between the first reference voltage, a second reference voltage and an intermediate voltage. The output from the switch is transmitted to a voltage divider circuit that produces a predetermined result when the switch output corresponds to the intermediate state. The output of the voltage divider is then provided to an analog-to-digital converter to decode the state of the switch. The three-state control signal may be used, for example, to place a vehicle component such as a windshield temperature controller or rear-window defogger into a desired one of three operating states. Similarly, the three-state concepts may be widely applied in many automotive, industrial, consumer electronics and other settings.

95 Claims, 3 Drawing Sheets

METHODS AND APPARATUS FOR PRODUCING A THREE-STATE SINGLE WIRE CONTROL

PRIORITY CLAIM

This application claims priority of U.S. Provisional Application Ser. No. 60/459,899 filed on Apr. 2, 2003, which is incorporated herein by reference.

TECHNICAL FIELD

The present invention generally relates to logic inputs, and more particularly relates to multi-state logic inputs suitable for use in automotive and other applications.

BACKGROUND

Modern vehicles contain numerous electronic and electrical switches. Vehicle features such as climate controls, audio system controls, windshield wiper controls, front and rear window temperature controls and the like are now activated, deactivated and adjusted in response to electrical signals generated by various switches in response to driver/passenger inputs, sensor readings and the like. These electrical control signals are typically relayed from the switch to the controlled devices via copper wires or other electrical conductors. Presently, many control applications use a single wire to indicate two discrete states (e.g. ON/OFF, TRUE/FALSE, HIGH/LOW, etc.) using a high or low voltage transmitted on the wire. Alternatively, analog signals may be provided as continuous inputs to potentiometers or the like found in such devices as pedal position sensors, throttle plate position sensors and/or the like.

As consumers demand additional electronic features in newer vehicles, the amount of wiring present in the vehicle continues to increase. This additional wiring occupies valuable vehicle space, adds undesirable weight to the vehicle and increases the manufacturing complexity of the vehicle. There is therefore an ongoing need in vehicle applications to reduce the amount of wiring in the vehicle without sacrificing electronic features. Further, there is a need to increase the number of electronic functions in the vehicle without the additional weight, volume or complexity of additional wiring.

Accordingly, it is desirable to formulate systems and techniques for increasing the amount of control data that can be provided across a single electrical conductor. Moreover, there is a desire to create switching circuits capable of providing more than two data states across a single conductor. Furthermore, other desirable features and characteristics will become apparent from the subsequent detailed description and the appended claims, taken in conjunction with the accompanying drawings and the foregoing technical field and background.

BRIEF SUMMARY

Systems, methods and devices are described that provide a three-state control signal across a single electrical conductor. According to one embodiment, a three-position switch provides an output signal that selects between a first reference voltage, a second reference voltage (such as ground or common) and an intermediate voltage in response to user inputs or the like. The analog output from the switch is transmitted to a voltage divider circuit in the module receiving the input, which produces a known result when the switch output corresponds to the intermediate state. The output of the voltage divider may then be provided to an analog-to-digital converter to decode the state of the switch. The three-state control signal may be used in a wide array of automotive and other applications. The signal could be used, for example, to place a vehicle component such as a windshield temperature controller or rear-window defogger into a desired one of three operating states. In various further embodiments, the intermediate state may be used as a diagnostic state or the like.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a single conductor is utilized to indicate three logic states from a discrete actuator. In one embodiment, a switch or other voltage selector is used to produce three different voltage values on the conductor corresponding to a high voltage, a low voltage and an intermediate voltage. The intermediate state may correspond to an open circuit or other condition such that three separate voltage states are transmitted on the conductor. Transmitted signals are decoded by appropriate circuitry such as a voltage divider circuit in conjunction with an analog-to-digital (A/D) converter or the like.

Various circuits described below allow each conductor to provide signals of three logical states with sufficient signal-to-noise ratio and electrical hysteresis for common automotive applications. The switches, circuits, systems and concepts described herein may therefore define a new basic building block for electronic inputs, particularly in automotive applications. By increasing the number of logic states that can be represented with a given set of inputs, the number of cut leads or wires used to transmit equivalent data can be significantly reduced.

Using the concepts and structures described herein, ternary (i.e. three-state) logic may be exploited in a wide array of vehicle applications including heated seat controls, windshield defroster controls, rear window defogger controls, or the like. Using a single input and control line, for example, ternary signals can be used to provide distinct "off", "low heat" and "high heat" commands to a windshield or rear window defogger, heated seat or the like. Moreover, the by combining two or more ternary inputs, multiple states can be represented with far fewer signals than equivalent binary implementations. A five-speed HVAC fan, for example, could be controlled with two ternary inputs (capable of providing nine distinct state signals) rather than three binary inputs. These examples can be extrapolated to describe a more general benefit of ternary logic over binary logic, as shown in the following table:

TABLE 1

| Number of States | Binary Signals to Represent States | Ternary Signals to Represent States |
|---|---|---|
| 1–2 | 1 | 1 |
| 3 | 2 | 1 |
| 4 | 2 | 2 |
| 5–8 | 3 | 2 |
| 9 | 4 | 2 |
| 10–16 | 4 | 3 |
| 16–27 | 5 | 3 |

As can be seen from Table 1, a given number of states can typically be implemented with fewer ternary signals than conventional binary signals. Moreover, as additional states are needed, the benefits of ternary signals over binary become even more pronounced. Representing two hundred distinct states, for example, would require eight binary bits, but only five ternary signals. Conversely, eight ternary signals could represent over 6,500 distinct states, whereas eight binary signals can represent only 256 distinct states. Accordingly, ternary signals provide far greater efficiencies of scale than comparable binary signal implementations.

Figure 1:
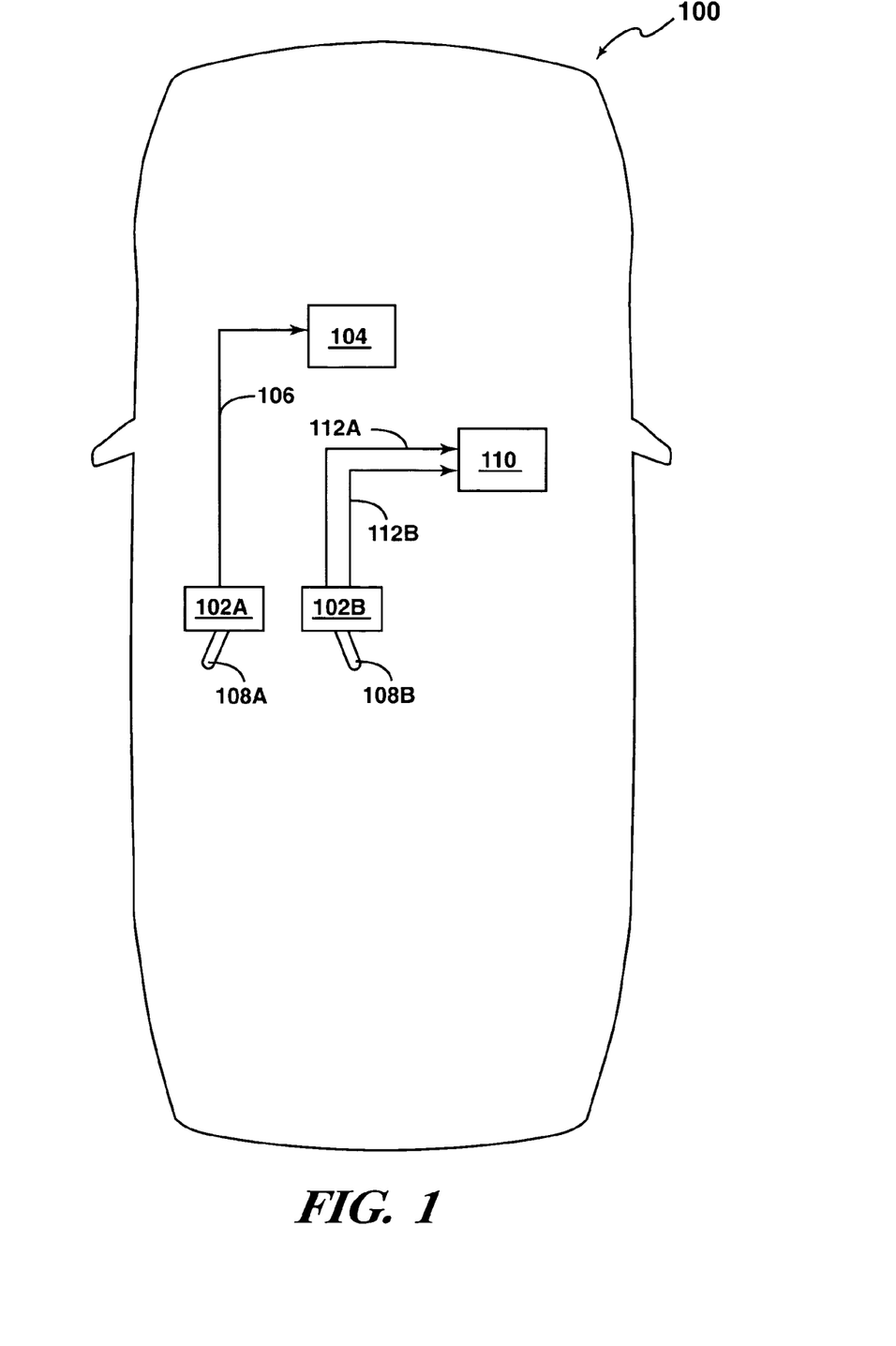
FIG. 1 is a block diagram of an exemplary vehicle.

Turning now to the drawing figures and with initial reference to FIG. 1, an exemplary vehicle 100 suitably includes any number of components 104, 110 communicating with various switches 102A, 102B to receive control signals 106, 112A–B, respectively. The various components 104, 110 may represent any electric or electronic devices present within vehicle 100, including, without limitation, windshield or rear window defog/defrost controls, driver/passenger heated seat controls, power mirror selection devices, multi-speed front/rear windshield wiper controls, power mirror actuators, power door lock actuators, power lumbar controls, interior or exterior light controls, dome light override (DLO) controls, power sunroof controls, memory seat or personalization selectors, power extended mirror controls, power seat controls, power seat recline controls, audio system controls, climate control system controls and/or any other electrical systems, components or devices within vehicle 100.

Switches 108A–B are any devices capable of providing various logic signals 106, 112A–B to components 104, 110 in response to user commands, sensor readings or other input stimuli. In an exemplary embodiment, switches 102A–B respond to user selections made by displacing or activating a lever 108A–B or other actuator on switch 102A–B as appropriate. Various switches 102A–B may be formulated with electrical, electronic and/or mechanical actuators to produce appropriate ternary output signals onto a wire or other electrical conductor joining switches 102 and components 104, 110, as described more fully below. These ternary signals may be processed by components 104, 110 to place the components into desired states as appropriate. In various embodiments, a single ternary signal 106 may be provided (e.g. between switch 102A and component 104 in FIG. 1), and/or multiple ternary signals 112A–B may be provided (e.g. between switch 102B and component 110 in FIG. 1).

Figure 2:
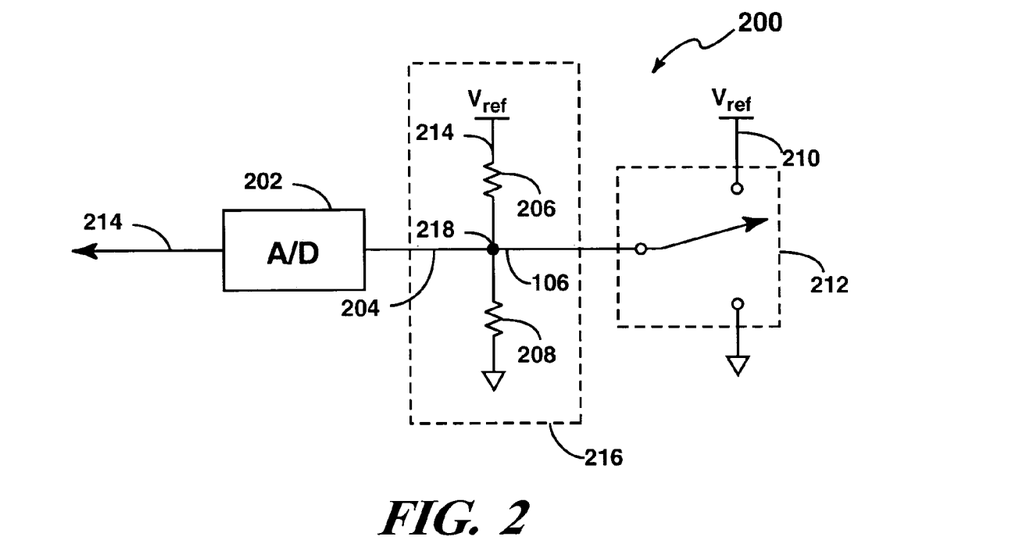
FIG. 2 is a circuit diagram of an exemplary embodiment of a switching circuit.

Referring now to FIG. 2, an exemplary switching circuit 200 suitably includes a switch 212, a voltage divider circuit 216 and an analog-to-digital (A/D) converter 202. Switch 212 suitably produces a three-state output that is appropriately transmitted across conductor 106 and decoded at voltage divider circuit 216 and/or A/D converter 202. The circuit 200 shown in FIG. 2 may be particularly useful for embodiments wherein a common reference voltage ($V_{ref}$) for A/D converter 202 is available to switch 212 and voltage divider circuit 216, although circuit 200 may be suited to array of alternate environments as well.

Switch 212 is any device, circuit or component capable of producing a ternary output on conductor 106. In various embodiments, switch 212 is a conventional double-throw switch as may be commonly found in many vehicles. Alternatively, switch 212 is implemented with a multi-position operator or other voltage selector as appropriate. Switch 212 may be implemented with a conventional three-position low-current switch, for example, as are commonly found on many vehicles. Various embodiments of these switches optionally include a spring member (not shown) or other mechanism to bias an actuator 106 (FIG. 1) into a default position, although bias mechanisms are not found in all embodiments. Switch 212 generally corresponds to the various switches 102A–B shown in FIG. 1.

Switch 212 is typically configured to select an output from two reference voltages (such as a high reference voltage (e.g. $V_{ref}$) and a low reference voltage (e.g. ground)) and an intermediate value. In an exemplary embodiment, $V_{ref}$ is the same reference voltage provided to digital circuitry in vehicle 100 (FIG. 1), and may be the same reference voltage provided to A/D converter 202. In various embodiments, $V_{ref}$ is on the order of five volts or so, although other embodiments may use widely varying reference voltages. The intermediate value provided by switch 212 may correspond to an open circuit (e.g. connected to neither reference voltage), or may reflect any intermediate value between the upper and lower reference voltages. An intermediate open circuit may be desirable for many applications, since an open circuit will not typically draw a parasitic current on signal line 106 when the switch is in the intermediate state, as described more fully below. Additionally, the open circuit state is relatively easily implemented using conventional low-current three-position switches 212.

Switch 212 is therefore operable to provide a ternary switch output signal 106 selected from the two reference signals (e.g. $V_{ref}$ and ground in the example of FIG. 2) and an intermediate state. This switch output signal 106 is provided to decoder circuitry in one or more vehicle components (e.g. components 104, 110 in FIG. 1) as appropriate. In various embodiments, the three-state switch 212 is simply a multi-position switch that merely selects between the two reference voltages (e.g. power and ground) and an open circuit position or other intermediate condition. The switch is not required to provide any voltage division, and consequently does not require electrical resistors, capacitors or other signal processing components other than simple selection means. In various embodiments, switch 212 does include a mechanical interlocking capability such that only one state (e.g. power, ground, intermediate) is selected at any given time. Moreover, switch 212 may be operated in a momentary and/or continuous manner. In the former case, switch 212 provides a pulsed output 106 as the actuator 106 (FIG. 1) is moved into position. In the latter case, switch 212 continues to provide output signal 106 until the actuator is moved to a different position, as appropriate. Momentary and continuous functions may be intermixed as appropriate; in one embodiment, for example, output signals 106 may be pulsed when either of the reference voltages are selected, yet output signal 106 remains continuous when switch 202 is in the intermediate state. Many variations of continuous and/or momentary switching could be formulated in a wide array of alternate embodiments.

The ternary signals 106 produced by switch 212 are received at a voltage divider circuit 216 or the like at component 104, 110 (FIG. 1). As shown in FIG. 2, voltage divider circuit 216 suitably includes a first resistor 206 and a second resistor 208 coupled to the same high and low reference signals provided to switch 212, respectively. These resistors 206, 208 are joined at a common node 218, which also receives the ternary signal 106 from switch 212 as appropriate. In the exemplary embodiment shown in FIG. 2, resistor 206 is shown connected to the upper reference voltage $V_{ref}$ 214 while resistor 208 is connected to ground. While the values of resistors 206, 208 vary from embodiment to embodiment, the values may be selected to be approximately equal to each other such that the common node is pulled to a voltage of approximately half the $V_{ref}$ voltage when an open circuit is created by switch 212. Hence, three distinct voltage signals (i.e. ground, $V_{ref}/2$, $V_{ref}$) may be provided at common node 218, as appropriate. While resistors 206, 208 are not necessarily identical, using resistor 206, 208 of similar or equal value may provide optimum signal-to-noise ratios for many embodiments. Alternatively, the magnitude of the intermediate voltage may be adjusted by selecting the respective values of resistors 206, 208 accordingly. In various embodiments, resistors 206, 208 are both selected as having a resistance on the order of about 1–50 kOhms, for example about 10 kOhms, although any other values could be used in a wide array of alternate embodiments. Relatively high resistance values may assist in conserving power and heat by reducing the amount of current flowing from $V_{ref}$ to ground, although alternate embodiments may use different values for resistors 206, 208. Higher resistance values may also provide the advantage of reducing the wattage of the resistor, thereby decreasing the size of the resistor needed in many embodiments.

The ternary voltages present at common node 208 are then provided to an analog-to-digital converter 202 to decode and process the signals 204 as appropriate. In various embodiments, A/D converter 202 is associated with a processor, controller, decoder, remote input/output box or the like. Alternatively, A/D converter 202 may be a comparator circuit, pipelined A/D circuit or other conversion circuit capable of providing digital representations 214 of the analog signals 204 received. In an exemplary embodiment, A/D converter 202 recognizes the high and low reference voltages, and assumes intermediate values relate to the intermediate state. In embodiments wherein $V_{ref}$ is equal to about five volts, for example, A/D converter may recognize voltages below about one volt as a "low" voltage, voltages above about four volts as a "high" voltage, and voltages between one and four volts as intermediate voltages. The particular tolerances and values processed by A/D converter 202 may vary in other embodiments. A/D converters 202 used in the various embodiments may have any bit resolution (e.g. 4 bit, 6 bit, 8 bit, 10 bit or the like), although using six or more bits of resolution may provide the advantage of relaxing the design requirements placed upon resistors 206 and 208.

As described above, then, ternary signals 106 may be produced by a switch 212, transmitted across a single carrier, and decoded by A/D converter 202 in conjunction with voltage divider circuit 216. Intermediate signals that do not correspond to the traditional "high" or "low" outputs of switch 212 are scaled by voltage divider circuit 216 to produce a known intermediate voltage that can be sensed and processed by A/D converter 202 as appropriate. In this manner, conventional switches 212 and electrical conduits may be used to transmit ternary signals in place of (or in addition to) binary signals, thereby increasing the amount of information that can be transported over a single conductor. This concept may be exploited across a wide range of automotive and other applications, as described more fully below in conjunction with FIG. 4.

Figure 3:
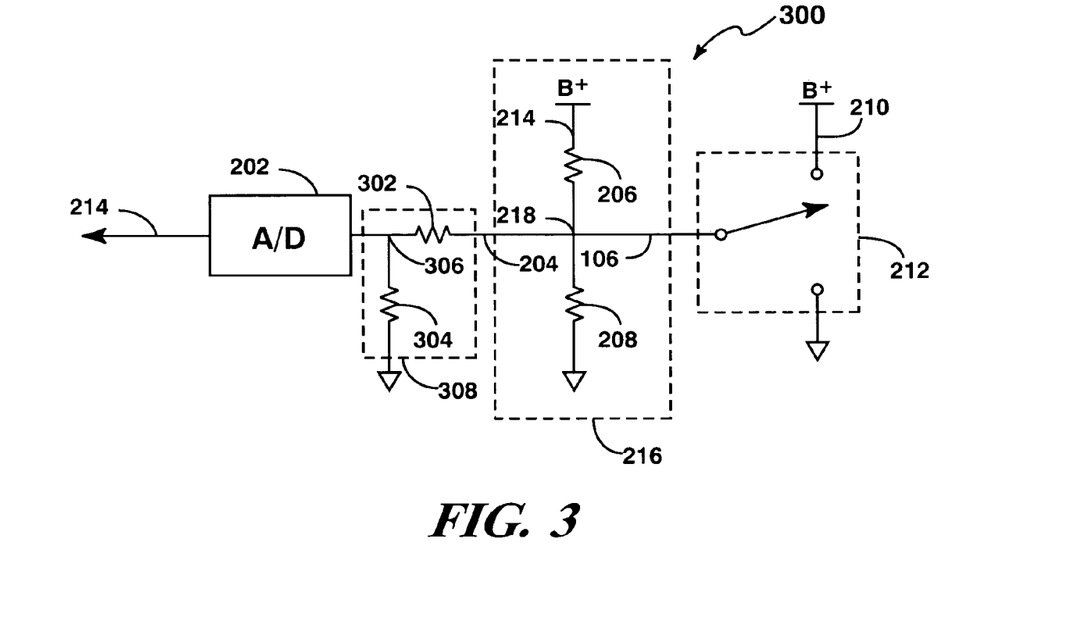
FIG. 3 is a circuit diagram of an alternate exemplary embodiment of a switching circuit.

Referring now to FIG. 3, an alternate embodiment of a switching circuit 300 suitably includes an additional voltage divider 308 in addition to switch 212, divider circuit 216 and A/D converter 202 described above in conjunction with FIG. 2. The circuit shown in FIG. 3 may provide additional benefit when one or more reference voltages (e.g. $V_{ref}$) provided to A/D converter 202 are unavailable or inconvenient to provide to switch 212. In this case, another convenient reference voltage (e.g. a vehicle battery voltage $B^+$, a run/crank signal, or the like) may be provided to switch 212 and/or voltage divider circuit 216 as shown. Using the concepts described above, this arrangement provides three distinct voltages (e.g. ground, $B^+/2$ and $B^+$) at common node 204. These voltages may be out-of-scale with those expected by conventional A/D circuitry 202, however, as exemplary vehicle battery voltages may be on the order of twelve volts or so. Accordingly, the voltages present at common node 204 are scaled with a second voltage divider 308 to provide input signals 306 that are within the range of sensitivity for A/D converter 202.

In an exemplary embodiment, voltage divider 308 includes two or more resistors 302 and 304 electrically arranged between common node 218 and the input 306 to A/D converter 202. In FIG. 3, resistor 302 is shown between nodes 218 and 306, with resistor 304 shown between node 306 and ground. Various alternate divider circuits 308 could be formulated, however, using simple application of Ohm's law. Similarly, the values of resistors 302 and 304 may be designed to any value based upon the desired scaling of voltages between nodes 218 and 306, although designing the two resistors to be approximately equal in value may provide improved signal-to-noise ratio for circuit 300. In an alternate embodiment, for example, voltage dividers 216 and 308 could be combined into a single network of two resistors having unequal values. This arrangement may create suboptimal signal-to-noise ratios in certain embodiments, but would likely reduce the number of discrete components used to implement circuit 300.

Figure 4:
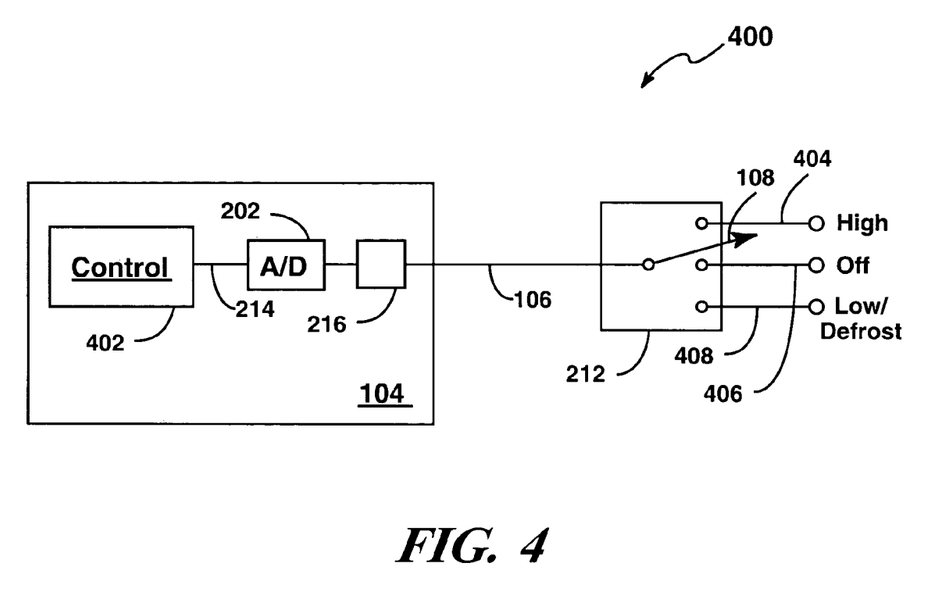
FIG. 4 is a circuit diagram of an exemplary switching circuit for a window heating system with three operating states.

Using the concepts set forth above, a wide range of control circuits and control applications may be formulated, particularly within automotive and other vehicular settings. As mentioned above, the ternary signals 106 produced by switches 102/212 may be used to provide control data to any number of vehicle components 104, 110 (FIG. 1). With reference now to FIG. 4, the three positions 404, 406, 408 of switch 212 may be appropriately mapped to various states, conditions or inputs of component 104. As described above, component 104 suitably includes a processor or other controller 402 that includes (or at least communicates with) A/D converter 202 and voltage divider circuit 21 to receive ternary signals 106 from switch 212. The digital signals 214 produced by A/D converter 202 are processed by controller 402 as appropriate to respond to the three-state input received at switch 212. Accordingly, mapping between states 404, 406 and 408 is typically processed by controller 402, although alternate embodiments may include signal processing in additional or alternate portions of system 400.

As used herein, state 404 is referred to as '1' or 'high' and corresponds to a short circuit to $V_{ref}$, $B^+$ or another high reference voltage. Similarly, state 408 is referred to as '0' or 'low', and corresponds to a short circuit to ground or another appropriate low reference voltage. Intermediate state 406 is described as 'value' or 'v', and may correspond to an open circuit or other intermediate condition of switch 212.

In many embodiments, intermediate state 406 is most desirable as a "power off" state, since the open circuit causes little or no current to flow from switch 212, thereby conserving electrical power. Moreover, an 'open circuit' fault is typically more likely than a faulty short to either reference voltage; the most likely faults therefore result in turning a feature off rather than leaving them 'stuck' in an on position. Conversely, some safety-related features (e.g. headlights) may be configured to remain active in the event of a fault, if appropriate. Accordingly, the various states switch 212 described herein may be re-assigned arbitrarily to represent the various inputs and/or operating states of component 104 as appropriate.

Using the concepts set forth above, various exemplary mappings of switch 212 for certain automotive applications may be defined as follows. While the following mappings are intended to be non-exclusive and exemplary in nature, the various states have been selected with regard to fault likelihood such that the most likely faults result in the most conventionally-desirable effect. Nevertheless, other embodiments may differ from those set forth below.

In a heating system such as a passenger or driver seat heater, the various states of switch 212 may be mapped to provide a low current/power setting (low state 408), a high current/power setting (high state 404), and a power off setting (value state 406).

In a power mirror select system, the various states of switch 212 may be mapped to select neither mirror when value state 406 is selected, with low state 408 corresponding to the driver mirror and high state 404 selecting the passenger-side mirror.

In a two-speed front or rear windshield wiper control (with or without delay), the various states of switch 212 may be mapped to provide a lower speed or delay when low state 406 is selected and a higher speed or delay when high state 404 is selected. Value state 406 may correspond to a power off setting.

In a power window control, low state 408 may correspond to a "lower window" command and high state 404 may correspond to a "raise window" command. Value state 406 may correspond to an 'off' or 'no actuation' state.

In a power door lock control, low state 408 may correspond to an "unlock door" command and high state 404 may correspond to a "lock door" command. Value state 406 may correspond to an 'off' or 'no actuation' state.

In a power lumbar support control, low state 408 may correspond to a "decrease lumbar support" command and high state 404 may correspond to an "increase lumbar support" command. Value state 406 may correspond to an 'off' or 'no actuation' state.

In an exterior light control, low state 408 may correspond to a "parking lamps on" command and high state 404 may correspond to a "headlamps and parking lamps on" command. Value state 406 may correspond to an 'off' or 'no exterior lights' state. Alternatively, and as described above, alternate embodiments may activate the lights in the event of an open circuit fault.

In a power sunroof control, low state 408 may correspond to a "close sunroof" command and high state 404 may correspond to an "open sunroof" command. Value state 406 may correspond to an 'off' or 'no actuation' state.

In a seat memory control, low state 408 may correspond to a first personalization state and high state 404 may correspond to a second personalization state. Value state 406 may correspond to an 'off' or 'no actuation' state.

In a power extended mirror control, low state 408 may correspond to an "extended mirror retraction" command and high state 404 may correspond to an "extended mirror extension" command. Value state 406 may correspond to an 'off' or 'no actuation' state.

In a power seat control, low state 408 may correspond to a "seat forward (up)" command and high state 404 may correspond to a "seat backward (down)" command. Value state 406 may correspond to an 'off' or 'no actuation' state.

In a power seat incline control, low state 408 may correspond to a "seat recline" command and high state 404 may correspond to a "seat incline" command. Value state 406 may correspond to an 'off' or 'no actuation' state.

Ternary signals may also enable new functions such as multi-level heaters for windshields, rear windows and/or other windows in vehicle 100. In one embodiment, low state 408 produces a relatively low heater current and high state 404 produces a higher heater current. Value state 406 corresponds to a 'no current' condition, thereby turning the heater off. Such a scenario could be coupled with a timer for the high current state 408 that disables the higher value after an appropriate period of time, or reverts to the low current setting after an appropriate time has elapsed. Low current state 404 may also be configured on a timer, or may be allowed to run indefinitely as appropriate. Ternary signals could also be used to activate dashboard indicators for the multi-level heaters (or any other functions), with high state 408 and low state 404 each illuminating a different indicator and value state 406 extinguishing the indicator. Alternatively, pulse width modulation (PWM) techniques or the like may be used to alter the intensity of a single indicator such that the indicator is more intense when the heater is in the high current state 408 than when the heater is in the low current state 404.

Other applications of ternary switching include audio system controls (e.g. channel seek, volume), temperature controls, cruise control set/resume selection, transmission up/down controls and the like. Again, the various examples set forth herein are merely illustrations of the types of features that may be available from ternary signaling in an automotive context. Many additional and equivalent implementations of ternary signaling could be formulated beyond those set forth herein.

The concepts set forth herein may also be used in a wide array of equivalent embodiments and applications. Components that utilize only binary input, for example, could use the third command state provided by circuits 200, 300 above as a diagnostic state. With momentary reference again to FIGS. 2 and 3, if switch 212 provides only binary outputs 106 corresponding to either the high or low reference voltages, voltage divider circuit 216 is still capable of detecting intermediate signals corresponding to open circuits. If the A/D output 214 indicates an intermediate input state, then, it can be readily deduced that this state resulted from an open circuit somewhere in the system. If switch 212 is not configured to produce open circuits, any observed open circuits can indicate a wire break, a fault in switch 212, or another undesirable condition. An indication of an open circuit may therefore be used to trigger a flag, alarm or other indicator as appropriate.

Similar concepts could be used to detect other faults in various systems 200, 300. While open circuits may be the most likely faults observed in many embodiments, alternate embodiments may be used to detect faulty shorts to any of the reference voltages (e.g. $V_{ref}$, $B^+$, ground) by simply not using the corresponding output state of switch 212 and detecting subsequent occurrences of the undesired state with A/D converter 202 and voltage divider 216. The remaining two outputs of switch 212 may be used to provide the desired binary inputs to component 104 as appropriate. In systems designed to diagnose shorts to ground, for example, the "value" and "high" states can be configured to represent the two binary output states of the switch, whereas the third "low" state is used to diagnose shorts to ground. Similarly, shorts to the power reference may be diagnosed by configuring the low and value states to represent the binary output states of the switch using the third "high" state to identify shorts to the power reference as appropriate.

Again, fault most likely to occur in most embodiments is an open circuit condition. Accordingly, many binary functions may be configured with the low state representing a default (e.g. power off) state, the high state representing an actuated state, and the value state representing a diagnosable open circuit condition. Many binary functions that could exploit the diagnosable state functionality include, without limitation: hazard controls; air bag on/off controls; fog lamp controls; passenger seat sensing (e.g. low represents no passenger, high represents passenger present); seat belt latch monitors; traction control system (TCS) on/off controls; overdrive on/off controls; displacement on demand (DoD) selectors; rear window defogger controls; rear tow selection; OnStar or other emergency service selection(s) (e.g. call and initiate/end request switches); seat belt latch sensors; horn actuation controls; HVAC on/off control; radio on/off control; compact disk or cassette accept/eject control; air conditioning request switch; re-circulated air switch; external/internal temperature selection; redundant steering wheel control (e.g. HVAC or radio on/off controls); dome light override controls; trip odometer reset; door ajar indicators (e.g. side doors and cargo/trunk switches); manual door lock status (e.g. as used for theft determination); audio system selectors (e.g. auxiliary selectors, function selectors, bnad selectors, mute buttons, and the like); cruise control on/off selectors; overdrive/non-overdrive selectors; trip reset buttons; and the like. Again, the various applications described herein are intended as examples, and should not be construed as limiting the scope of the invention.

Although the various embodiments are most frequently described with respect to automotive applications, the invention is not so limited. Indeed, the concepts, circuits and structures described herein could be readily applied in any commercial, home, industrial, consumer electronics, personal computer, toy or other setting. Ternary switches and concepts could be used to implement a telephone keypad, for example, representing the twelve buttons with six ternary switches. Similarly, ternary switches could be used in touchpads such as those used in home appliances (e.g. microwave ovens, food processors, etc.) and in other applications. In such embodiments, the various states of the switches could represent, for example, high and low processing speeds or the like. Further, the vehicular concepts described herein could be readily applied in any vehicle operating in any aeronautical, aerospace, marine or other settings as well as in the automotive context.

While at least one exemplary embodiment has been presented in the foregoing detailed description, a vast number of variations exist. The various circuits described herein may be modified through conventional electrical and electronic principles, for example, or may be logically altered in any number of equivalent embodiments without departing from the concepts described herein. The exemplary embodiments described herein are intended only as examples, and are not intended to limit the scope, applicability, or configuration of the invention in any way. Rather, the foregoing detailed description will provide those skilled in the art with a convenient road map for implementing one or more exemplary embodiments. Various changes can therefore be made in the functions and arrangements of elements set forth herein without departing from the scope of the invention as set forth in the appended claims and the legal equivalents thereof.

What is claimed is:

1. A signal communications apparatus having an output that is switchable between three states, the signal communications apparatus comprising:
    a three-position input device having a first terminal coupled to a first reference voltage and a second terminal coupled to a second reference voltage, wherein the three-position input device is configured to select a switch output signal from the first reference voltage, the second reference voltage and an intermediate state; and
    a voltage divider circuit coupled to the first and second reference voltages and having a common node therebetween, wherein the voltage divider circuit is configured to receive the switch output signal at the common node and to produce a predetermined voltage at the common node when the switch output corresponds to the intermediate state to thereby produce the output of the signal communications apparatus.

2. The signal communications apparatus of claim 1 wherein the output of the signal communications apparatus is produced at the common node.

3. The signal communications apparatus of claim 1 wherein the voltage divider circuit comprises a first resistor and a second resistor coupled to the first and second reference voltages, respectively.

4. The signal communications apparatus of claim 3 wherein the switch output signal is a continuous signal.

5. The signal communications apparatus of claim 3 wherein the switch output signal is a momentary signal.

6. The signal communications apparatus of claim 3 further comprising a second voltage divider electrically coupled between the common node and the output of the signal communications apparatus, wherein the second voltage divider is configured to adjust the output of the signal communications apparatus when the switch output corresponds to the intermediate state.

7. The signal communications apparatus of claim 6 wherein the second voltage divider comprises a third resistor coupled between the common node and the output of the signal communications apparatus and a fourth resistor coupled between the output of the signal communications apparatus and the second reference voltage.

8. The signal communications apparatus of claim 1 wherein the intermediate state corresponds to an open circuit.

9. The signal communications apparatus of claim 1 wherein the switch output signal is produced from the first and second reference voltages and the intermediate state without voltage division in the three-position input device.

10. The signal communications apparatus of claim 9 wherein the three-position input device is further configured to provide mechanical interlocking between the three output states of the three-position input device.

11. A circuit for providing a three-state input to an analog-to-digital converter, the circuit comprising:
- a three-position switch having a first terminal coupled to a first reference voltage and a second terminal coupled to a second reference voltage, wherein the three-position switch is operable to select a switch output signal from the first reference voltage, the second reference voltage and an intermediate state; and
- a voltage divider circuit comprising a first resistor and a second resistor coupled to the first and second reference voltages, respectively, and having a common node therebetween corresponding to the input of the analog-to-digital converter, wherein the voltage divider circuit is configured to receive the switch output at the common node and to provide a predetermined voltage at the common node when the switch output corresponds to the intermediate state.

12. An electrical switching apparatus comprising:
- a switch having three operating states;
- a wire coupled to the switch to transmit an analog signal corresponding to one of the three operating states;
- a voltage divider coupled to the wire to receive the analog signal; and
- an analog-to-digital (A/D) converter coupled to the voltage divider, wherein the A/D converter is configured to determine the operating state of the switch from the analog signal.

13. A electronic switching system for placing a vehicle component into a desired one of three states, the switching system comprising:
- a three-position input device having a first terminal coupled to a first reference voltage and a second terminal coupled to a second reference voltage, wherein the three-position input device is operable to select a switch output signal from the first reference voltage, the second reference voltage and an intermediate state;
- a voltage divider circuit configured to receive the first and second reference voltages and having a common node located therebetween, wherein the voltage divider circuit is configured to receive the switch output at the common node and to provide a voltage divider output corresponding to a predetermined voltage when the switch output corresponds to the intermediate state, and otherwise to provide the voltage divider output corresponding to the switch output; and
- an analog-to-digital converter configured to receive and decode the voltage divider output to thereby place the vehicle component into the desired state.

14. The electrical switching system of claim 13 wherein the intermediate state corresponds to an open circuit.

15. The electrical switching system of claim 14 wherein the open circuit condition corresponds to a diagnosable state of the vehicle component.

16. The electrical switching system of claim 13 wherein the vehicle component is a windshield temperature controller.

17. The electrical switching system of claim 16 wherein the first reference voltage corresponds to a high temperature state, the second reference voltage corresponds to a low temperature state, and the intermediate state corresponds to an "off" state of the windshield temperature controller.

18. The electrical switching system of claim 16 wherein the second reference voltage corresponds to an electrical ground and the intermediate state corresponds to an open circuit.

19. The electrical switching system of claim 13 wherein the vehicle component is a rear window defogger.

20. The electrical switching system of claim 19 wherein the first reference voltage corresponds to a high temperature state, the second reference voltage corresponds to a low temperature state, and the intermediate state corresponds to an "off" state of the rear window defogger.

21. The electrical switching system of claim 20 wherein the second reference voltage corresponds to an electrical ground and the intermediate state corresponds to an open circuit.

22. The electrical switching system of claim 13 wherein the vehicle component is a heater for a seat in the vehicle.

23. The electrical switching system of claim 22 wherein the seat is a driver's seat.

24. The electrical switching system of claim 22 wherein the seat is a passenger's seat.

25. The electrical switching system of claim 22 wherein the first reference voltage corresponds to a high temperature state, the second reference voltage corresponds to a low temperature state, and the intermediate state corresponds to an "off" state of the heater.

26. The electrical switching system of claim 13 wherein the vehicle component is a power mirror selector.

27. The electrical switching system of claim 26 wherein the first reference voltage corresponds to a passenger mirror selected, the second reference voltage corresponds to a driver mirror selected, and the intermediate state corresponds to neither mirror being selected.

28. The electrical switching system of claim 13 wherein the vehicle component is a windshield wiper speed selector.

29. The electrical switching system of claim 28 wherein the first reference voltage corresponds to a first speed of the windshield wiper, the second reference voltage corresponds to a second speed of the windshield wiper, and the intermediate state corresponds to an off state of the windshield wiper.

30. The electrical switching system of claim 13 wherein the vehicle component is a power window controller.

31. The electrical switching system of claim 30 wherein the first reference voltage corresponds to a window lowering function, the second reference voltage corresponds to a window raising function, and the intermediate state corresponds to no window actuation.

32. The electrical switching system of claim 13 wherein the vehicle component is a power door lock controller.

33. The electrical switching system of claim 32 wherein the first reference voltage corresponds to a door unlocking function, the second reference voltage corresponds to a door locking function, and the intermediate state corresponds to no door lock actuation.

34. The electrical switching system of claim 13 wherein the vehicle component is a power lumbar function controller.

35. The electrical switching system of claim 34 wherein the first reference voltage corresponds to a decrease in the lumbar support, the second reference voltage corresponds to an increase in the lumbar support, and the intermediate state corresponds to no actuation of the lumbar support.

36. The electrical switching system of claim 13 wherein the vehicle component is an exterior light controller.

37. The electrical switching system of claim 36 wherein the first reference voltage corresponds to parking lamp on condition, the second reference voltage corresponds to a headlamps on condition, and the intermediate state corresponds to a no exterior lights on condition.

38. The electrical switching system of claim 37 wherein the headlamps on condition comprises both headlamps and parking lamps being in an on condition.

39. The electrical switching system of claim 13 wherein the vehicle component is a power sunroof control.

40. The electrical switching system of claim 39 wherein the first reference voltage corresponds to a sunroof close actuation, the second reference voltage corresponds to a sunroof open actuation, and the intermediate state corresponds to no actuation of the power sunroof.

41. The electrical switching system of claim 13 wherein the vehicle component is a personalization selector.

42. The electrical switching system of claim 41 wherein the first reference voltage corresponds to a first personalization, the second reference voltage corresponds to a second personalization, and the intermediate state corresponds to neither personalization.

43. The electrical switching system of claim 41 wherein the personalization selector is a selector for a seat in the vehicle.

44. The electrical switching system of claim 13 wherein the vehicle component is a power extended mirror control.

45. The electrical switching system of claim 44 wherein the first reference voltage corresponds to a retraction of the power extended mirror, the second reference voltage corresponds to extension of the power extended mirror, and the intermediate state corresponds to no power extended mirror actuation.

46. The electrical switching system of claim 13 wherein the vehicle component is a power seat control.

47. The electrical switching system of claim 46 wherein the first reference voltage corresponds to an actuation of the power seat in a first direction, the second reference voltage corresponds to an actuation of the power seat in a second direction, and the intermediate state corresponds to no actuation of the power seat.

48. The electrical switching system of claim 13 wherein the vehicle component is a power seat incline control.

49. The electrical switching system of claim 48 wherein the first reference voltage corresponds to a recline of the power seat, the second reference voltage corresponds to an incline of the power seat, and the intermediate state corresponds to no actuation of the power seat.

50. The electrical switching system of claim 13 wherein the vehicle component is a channel seek selector for a vehicle audio system.

51. The electrical switching system of claim 13 wherein the vehicle component is a volume control for a vehicle audio system.

52. The electrical switching system of claim 13 wherein the vehicle component is a vehicle temperature control.

53. The electrical switching system of claim 13 wherein the vehicle component is a set/resume selector for a vehicle cruise control.

54. The electrical switching system of claim 13 wherein the vehicle component is a transmission up/down shift selector.

55. An electrical switching system capable of diagnosing a fault condition relating to a vehicle component, the electrical switching system comprising:
a switch operable to select a switch output signal from a first state and a second state;
a voltage divider circuit configured to receive the switch output signal and to provide a voltage divider output in response to the switch output signal, wherein the three-state voltage divider output comprises one of three states corresponding to the first and second states of the switch output signal in addition to a diagnosable state, wherein the diagnosable state corresponds to the fault condition; and
an analog-to-digital converter configured to receive and decode the voltage divider output to thereby place the vehicle component into the desired state and to identify the fault condition if the diagnosable state occurs.

56. The electrical switching system of claim 55 wherein the diagnosable state comprises an open circuit condition.

57. The electrical switching system of claim 56 wherein the first and second states comprise a short to power and short to ground, respectively.

58. The electrical switching system of claim 55 wherein the diagnosable state comprises a short to ground.

59. The electrical switching system of claim 58 wherein the first and second states comprise an open circuit and short to power, respectively.

60. The electrical switching system of claim 55 wherein the diagnosable state comprises a short to power.

61. The electrical switching system of claim 60 wherein the first and second states comprise a short to ground and open circuit, respectively.

62. The electrical switching system of claim 55 wherein the vehicle component is a hazard control.

63. The electrical switching system of claim 55 wherein the vehicle component is an airbag on/off control.

64. The electrical switching system of claim 55 wherein the vehicle component is a fog lamp control.

65. The electrical switching system of claim 55 wherein the vehicle component is a passenger sensor.

66. The electrical switching system of claim 55 wherein the vehicle component is a seat belt latch indicator.

67. The electrical switching system of claim 55 wherein the vehicle component is a traction control system on/off switch.

68. The electrical switching system of claim 55 wherein the vehicle component is an overdrive on/off control.

69. The electrical switching system of claim 55 wherein the vehicle component is a displacement on demand (DoD) selector.

70. The electrical switching system of claim 55 wherein the vehicle component is a rear defogger control.

71. The electrical switching system of claim 55 wherein the vehicle component is a rear tow selector.

72. The electrical switching system of claim 55 wherein the vehicle component is a request switch for a vehicle emergency communications service.

73. The electrical switching system of claim 72 wherein the vehicle component comprises an emergency selection, call and initiate/end request switch.

74. The electrical switching system of claim 55 wherein the vehicle component is a seat belt latch sensor.

75. The electrical switching system of claim 55 wherein the vehicle component is a horn actuation control.

76. The electrical switching system of claim 55 wherein the vehicle component is HVAC on/off control.

77. The electrical switching system of claim 55 wherein the vehicle component is an audio system on/off control.

78. The electrical switching system of claim 55 wherein the vehicle component is a compact disk accept/eject control.

79. The electrical switching system of claim 55 wherein the vehicle component is a cassette eject control.

80. The electrical switching system of claim 55 wherein the vehicle component is an air conditioning request switch.

81. The electrical switching system of claim 55 wherein the vehicle component is a re-circulated air selector.

82. The electrical switching system of claim 55 wherein the vehicle component is an external/internal temperature switch.

83. The electrical switching system of claim 55 wherein the vehicle component is a redundant steering wheel control.

84. The electrical switching system of claim 83 wherein the redundant steering wheel control is an audio system control.

85. The electrical switching system of claim 83 wherein the redundant steering wheel control is a climate control system control.

86. The electrical switching system of claim 55 wherein the vehicle component is a dome light override.

87. The electrical switching system of claim 55 wherein the vehicle component is a trip odometer reset.

88. The electrical switching system of claim 55 wherein the vehicle component is a door ajar indicator.

89. The electrical switching system of claim 55 wherein the vehicle component is a manual door lock status indicator.

90. The electrical switching system of claim 55 wherein the vehicle component is an audio system auxiliary function selector.

91. The electrical switching system of claim 55 wherein the vehicle component is an audio system band selector.

92. The electrical switching system of claim 55 wherein the vehicle component is an audio system mute button.

93. The electrical switching system of claim 55 wherein the vehicle component is a cruise control on/off selector.

94. The electrical switching system of claim 55 wherein the vehicle component is a overdrive selector.

95. The electrical switching system of claim 55 wherein the vehicle component is a trip reset button.

\* \* \* \* \*